United States Patent
Montemurro et al.

(10) Patent No.: US 12,133,164 B2
(45) Date of Patent: Oct. 29, 2024

(54) METHOD AND SYSTEM FOR ENHANCED CHANNEL MAP ADVERTISEMENTS

(71) Applicant: HUAWEI TECHNOLOGIES CO., LTD., Shenzhen (CN)

(72) Inventors: Michael Montemurro, Toronto (CA); Stephen McCann, Hampshire (GB); Sheng Sun, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 351 days.

(21) Appl. No.: 17/576,382

(22) Filed: Jan. 14, 2022

(65) Prior Publication Data

US 2023/0232320 A1    Jul. 20, 2023

(51) Int. Cl.
*H04W 48/16*    (2009.01)
(52) U.S. Cl.
CPC .................................. *H04W 48/16* (2013.01)
(58) Field of Classification Search
CPC ..... H04W 48/16; H04W 48/14; H04W 48/18; H04W 48/20
USPC ......................................................... 455/434
See application file for complete search history.

(56) References Cited

U.S. PATENT DOCUMENTS

| | | | | |
|---|---|---|---|---|
| 2016/0057186 A1* | 2/2016 | Jose | ........................ | H04L 45/02 370/312 |
| 2017/0208006 A1* | 7/2017 | Patil | ..................... | H04W 48/20 |
| 2022/0210661 A1* | 6/2022 | Richards | ............. | H04W 72/541 |
| 2023/0098851 A1* | 3/2023 | Furuichi | ............... | H04W 28/16 455/450 |
| 2023/0232315 A1* | 7/2023 | Chitrakar | .............. | H04W 48/16 370/329 |

FOREIGN PATENT DOCUMENTS

WO     WO-2022249151 A1 * 12/2022  ............ H04W 16/14

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Standard 802.11, 2020, 4379 pages.

* cited by examiner

*Primary Examiner* — Hirdepal Singh

(57) ABSTRACT

The present disclosure provides for methods, systems and apparatus related to WLAN enhanced channel map advertisements. An aspect of the disclosure provides for a method for discovering a network. The method includes sending a discovery request to an access point for discovering a network, the discovery request requesting for: available channels of access points within a radio range of the device, one or more access network operators for the available channels, and one or more service providers for the available channels. The method further includes receiving from the access point a response message including one or more lists indicative of: the available channels, the one or more access network operators, and the one or more service providers. In some embodiments, the response message is based on one of: internal data of the access point, and databases indicative access network operators and service providers.

15 Claims, 14 Drawing Sheets

| Fields | Presence | Descriptions |
|---|---|---|
| NAME: AccessNetworkOperator(s)<br>DATA TYPE: string or number list | Optional | This field represents the identity of the access network operator(s) associated with the WLAN infrastructure. |
| NAME: ServiceProvider(s)<br>DATA TYPE: string or number list | Optional | This field represents the identity of the service provider(s) associated with the globalOperatingClass. |

| TBTT Information Header 502 | Operating Class 504 | Channel Number 506 | TBTT Information Set 508 | Access Network Operator(s) 510 | Service Provider(s) 512 |

| Element ID 602 | Length 604 | Current Operating Class 606 | Operating Class 608 | Access Network Operator(s) 610 | Service Provider(s) 612 |

| Length 704 | Access Network Operator(s) 710 | Service Provider(s) 712 |

| Element ID 902 | Length 904 | Current Operating Class 906 | Operating Class 908 | Upper Layer Application 910 | Network Access Provider(s) 912 |

1102. Sending to an access point a request for one or more of: available channels, access network operator, and service providers.

1104. Receiving from an access point a response comprising one or more lists indicative of: the available channels, the one or more access network operators, and the one or more eservice providers.

1106. Selecting a channel based on the received available channels.

1108. Corresponding to an access point corresponding with the selected channel.

1110. Connecting to a service provider of the one or more service providers.

1202. receiving a request for discovering a network, the request requesting for: available channels of access points within a radio range of the device; one or more access network operators for the available channels; and one or more service providers for the available channels.

1204. determining network information based on the discovery request.

1206. sending, to an access network operator database, a request for the available channels and the one or more access network operators; and receiving, from the access network operator database, a response message indicating the available channels and the one or more access network operators.

1208. sending, to a service provider database, a request for the one or more service providers; and receiving, from the service provider database, a response message indicating the one or more service providers.

1210. sending a response message comprising the network information comprising one or more lists indicative of: the available channels, the one or more access network operators, and the one or more service providers.

1302. approaching, from a first regulatory domain, a second regulatory domain, wherein each of the first regulatory domain and the second regulatory domain has respective channel settings.

1304. determining, at a regulatory domain boundary between the first regulatory domain and the second regulatory domain, channel settings for the second regulatory domain comprising one or more of: available channels and access network operators associated with the available channels.

1306. sending a discovery request for the channel settings for the second regulatory domain to an upper layer application of the device; and receiving the channel settings for the second regulatory domain from the upper layer application of the device.

1308. selecting a channel and an associated access network operator from the channel settings for the second regulatory domain.

1310. communicating with an intelligent transport system in the second regulatory domain.

FIG. 13

METHOD AND SYSTEM FOR ENHANCED CHANNEL MAP ADVERTISEMENTS

CROSS-REFERENCE TO RELATED APPLICATIONS

This is the first application filed for the present invention.

FIELD OF THE INVENTION

The present invention pertains to the field of communication networks, and in particular to systems and methods for wireless local area network (WLAN) enhanced channel map advertisements.

BACKGROUND

To discover a network (e.g., Wi-Fi or Wi-Fi CERTIFIED Passpoint (commonly referred to as Passpoint)), mobile WLAN devices undergo a discovery procedure for discovering available channels, network operators and service providers. However, existing discovery procedures can be inefficient and cause significant consumption of power and time. Further, as more and more unlicensed bands are made available for WLAN operation, efficiently discovering, by a device, WLAN infrastructure that has suitable credentials for connectivity has become more challenging.

In addition, different regulatory domains can have different Intelligent Transport System (ITS) band allocations and different channel maps for operation. A WLAN device crossing a border between such regions may be unaware of the change in channel maps or ITS bands. Existing methods may be inadequate for addressing the challenges posed by the different regulatory domains.

Therefore, there is a need for systems and methods for WLAN enhanced channel map advertisements that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

The present disclosure provides for methods, systems and apparatus related to WLAN enhanced channel map advertisements. According to a first aspect, a method performed by a device is provided. The method includes sending a discovery request to an access point for discovering a network, the discovery request requesting for: available channels of access points within a radio range of the device, one or more access network operators for the available channels, and one or more service providers for the available channels. The method further includes receiving from the access point a response message including one or more lists indicative of: the available channels, the one or more access network operators, and the one or more service providers. The method may provide for an enhanced procedure for discovering a network. The method may provide for an enhanced procedure for discovering channel information, network access provider information, and service provider information.

In some embodiments of the first aspect, the response message is based on internal data of the access point. The method may provide for an efficient way, via internal data, to discover a network.

In some embodiments of the first aspect, the response message is based on one or more databases indicative of one or more of access network operators and one or more of service providers. In some embodiments of the first aspect, the response message includes one or more fields indicating one or more of access network operators and service providers. The method may provide for an improved procedure that is resource efficient.

In some embodiments of the first aspect, the method further includes selecting a channel based on the received available channels. In some embodiments of the first aspect, the method further includes corresponding to an access point corresponding with the selected channel. In some embodiments of the first aspect, the method further includes connecting to a service provider of the one or more service providers.

According to a second aspect, a second method performed by an access point is provided. The method includes receiving, from a device, a discovery request for discovering a network, the discovery request requesting for: available channels of access points within a radio range of the device, one or more access network operators for the available channels, and one or more service providers for the available channels. The method further includes determining network information based on the discovery request. The method further includes sending, to the device, a response message including the network information including one or more lists indicative of: the available channels, the one or more access network operators, and the one or more service providers. The method may provide for an enhanced procedure for discovering a network. The method may provide for an improved procedure that is resource efficient.

In some embodiments of the second aspect, the determining network information based on the discovery request includes determining the network information based on internal data of the access point. The method may provide for an efficient way, via internal data, to discover a network.

In some embodiments of the second aspect, the determining network information based on the discovery request includes sending, to an access network operator database, a request for the available channels and the one or more access network operators. In some embodiments of the second aspect, the determining network information based on the discovery request further includes receiving, from the access network operator database, a response message indicating the available channels and the one or more access network operators.

In some embodiments of the second aspect, the method further includes sending, to a service provider database, a request for the one or more service providers. In some embodiments of the second aspect, the method further includes receiving, from the service provider database, a response message indicating the one or more service providers. The method may provide for an improved procedure that is resource efficient.

In some embodiments of the second aspect, the response message includes one or more fields indicating: the one or more access network operators and the one or more service providers.

According to a third aspect, an apparatus is provided, where the apparatus includes modules configured to perform the methods, according to the different aspects described herein.

According to a fourth aspect, an apparatus is provided, where the apparatus includes: a memory, configured to store a program; a processor, configured to execute the program stored in the memory, and when the program stored in the memory is executed, the processor is configured to perform the methods in the different aspects described herein.

According to a fifth aspect, a computer readable medium is provided, where the computer readable medium stores program code executed by a device, and the program code is used to perform the methods the different aspects described herein.

According to a sixth aspect, a chip is provided, where the chip includes a processor and a data interface, and the processor reads, by using the data interface, an instruction stored in a memory, to perform the different aspects described herein.

Other aspects of the disclosure provide for apparatus, and systems configured to implement the methods according to the different aspects disclosed herein. For example, an electronic device can be configured with machine readable memory containing instructions, which when executed by the processors of these devices, configures the device to perform the methods disclosed herein.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 4 illustrates enhanced message fields for the Wi-Fi Alliance (WFA) Automated Frequency Coordination (AFC) system, according to an embodiment of the present disclosure.

FIG. 5 illustrates an enhanced neighbor access point (AP) information field format, according to an embodiment of the present disclosure.

FIG. 6 illustrates an enhanced supported operating class element field format, according to an embodiment of the present disclosure.

FIG. 7 illustrates an Access Network Query Protocol (ANQP) element field format, according to an embodiment of the present disclosure.

FIG. 9 illustrates an enhanced frame field format, according to an embodiment of the present disclosure.

FIG. 11 illustrates a discovery procedure according to an embodiment of the present disclosure.

FIG. 12 illustrates another discovery procedure according to an embodiment of the present disclosure.

FIG. 13 illustrates another discovery procedure according to an embodiment of the present disclosure.

It will be noted that throughout the appended drawings, like features are identified by like reference numerals.

DETAILED DESCRIPTION

Wireless local area network (WLAN) secure public hotspot access, such as provided by Passpoint, requires a client to discover channel as well as operator information for Wi-Fi public hotspots. The operator information comprises one or more of: an identity or identifier (ID) of the access network operator, who controls access to the WLAN infrastructure; and an ID of the service provider, who controls access to the services required by the client device.

Channel information for WLAN operation can be provided by one of the following: a WFA AFC system, IEEE 802.11 in unlicensed bands, IEEE 802.11 in master controlled bands, and IEEE 802.11 in an Intelligent Transport System (ITS) band.

The WFA AFC refers to a system that can automatically determine and provide one or more lists of available frequencies for use by an access points operating in the 5.925-6.425 GHz and 6.525-6.875 GHz bands.

The IEEE 802.11 in unlicensed bands refers to the Supported Operating Classes element that can be used by a device to advertise the operating classes within which it is currently configured to operate (and therefore the operating channels). The IEEE 802.11 in unlicensed bands may further refer to the Reduced Neighbor Report (RNR) for co-located AP's operating in a different band.

The IEEE 802.11 in master controlled bands refers to a white space map that can be transmitted by a master device (typically an AP) to devices indicating available channels within the current location. The white space map can be transmitted by an out of band method. The master device in turn can obtain a list of available channels from a centralized database. This technology can be used for WLAN operation in Television White Space bands (TVWS).

In the context of IEEE 802.11 in the ITS band, operating channels may be fixed within a radio regulatory area and can be typically built into the system for a vehicle operating as an "Outside the Context of BSS" (OCB) device. An upper layer application (ULA) can contain a channel map (i.e., list of available channel numbers) and an operator identity (e.g., a city transportation system), which may both be either static or recently updated.

Currently, mobile WLAN terminals or devices discover a network (e.g., Passpoint) operating in a given regulatory domain as follows. First, the devices discover available channels or bands at a location and time. Then, the devices discover an access network operator and a service provider.

Figure 1A:
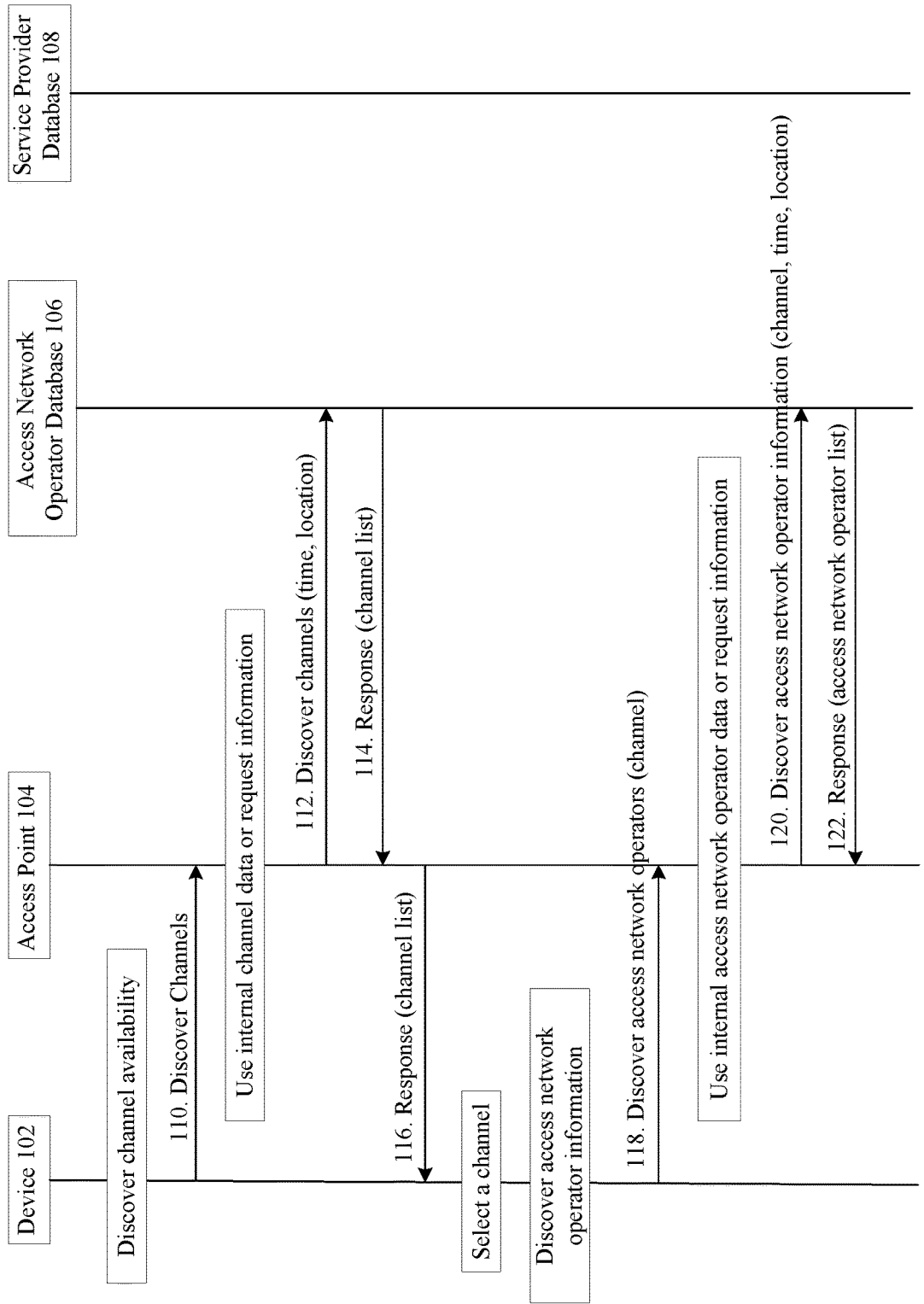
FIGS. 1A and 1B illustrate a discovery message flow for channel, access network operator and service provider information, according to an embodiment of the present disclosure.
Figure 1B:
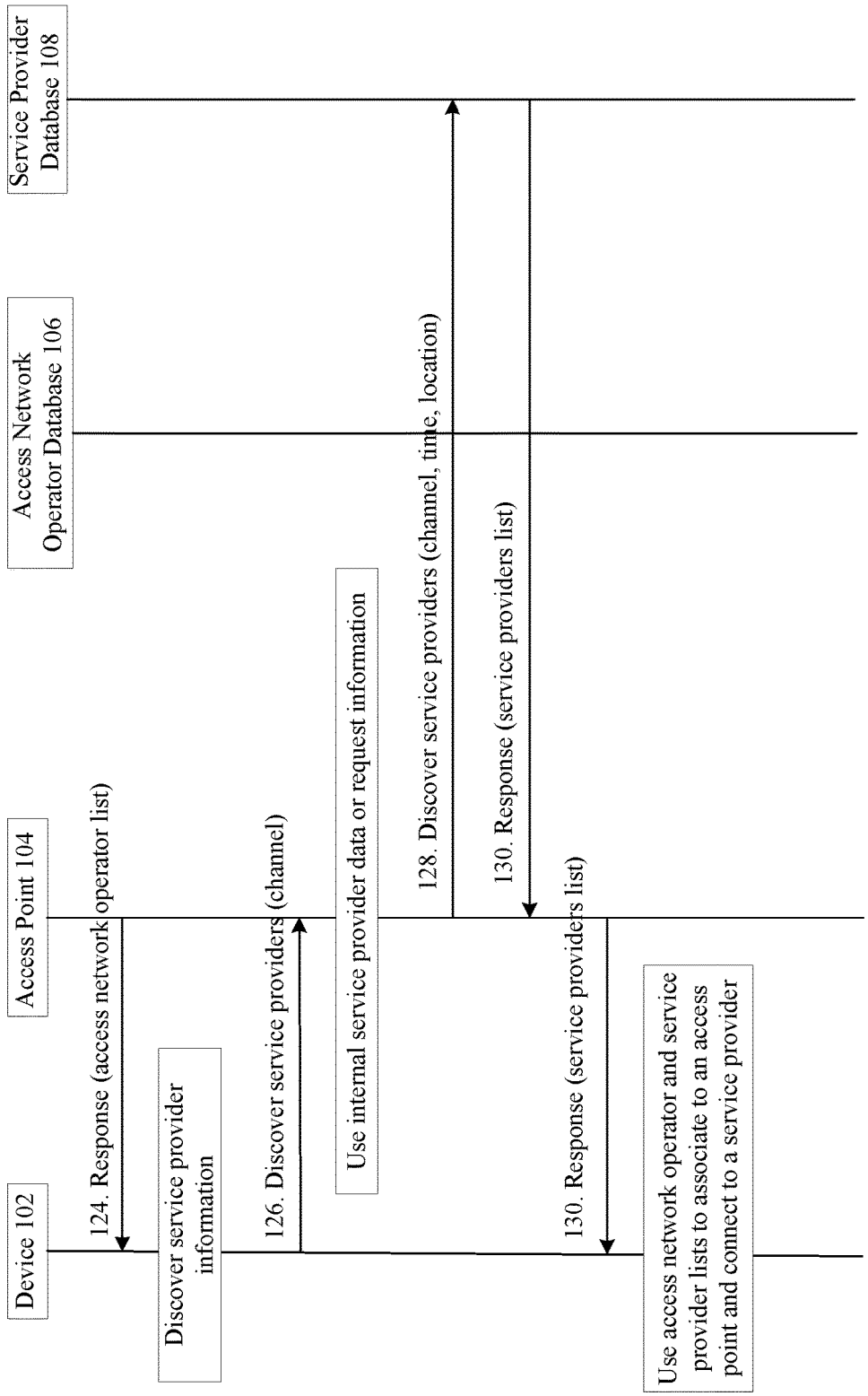

FIGS. 1A and 1B illustrate a discovery message flow for channel, access network operator and service provider information, according to an embodiment of the present disclosure.

In an embodiment, device 102 can discover channel availability. At 110, device 102 can send a Discover Channels request to an Access Point 104. Examples of Discover Channels requests can include: requests used by a device for WFA AFC use, and requests used by an IEEE 802.11af enabled device for Television White Space operation.

In an embodiment, if the Access Point 104 can use internal data to determine the available channels (e.g., channels 1-11 support within the 2.4 GHz band), Access Point 104 can directly respond with a channel list, such as the response at 116. As may be appreciated by a person skilled in the art, the channel used for the request at 110 may be a different channel (either in the same band or in a different band) from that of the channel list. For example, a request for 6 GHz channel information may be transmitted over a 2.4 GHz channel.

Otherwise, if Access Point 104 is unable to respond to the request via its internal channel data, at 112, the Access Point 104 can send a Discover Channels request message to a channel and access network operator information database (which may be referred to as Access Network Operator Database 106). The Discover Channels request message may comprise information associated with one or more of the Access Point 104 and the device 102. The information associated may comprise time and location information. The Access Network Operator Database 106 may be co-located or be common to a group of Access Points. In some embodiments the time and location information could originate in the Access Point 104, or originate in the Device 102 being transmitted within the Discover Channels request message at 110.

At 114, the Access Network Operator Database 114 can respond with a channel list of available channels of Access Points within radio range of the device 102. The Response at 114 may take into account location and time.

The Access Point 104 can then then respond, at 116, to the device 102 with a channel list of available channels within the radio range of the device (e.g., a list of available Access Points and their channels including itself 104). Based on the returned channel list, the device 102 can then decide upon which access point and corresponding channel(s) to use.

Once the device 102 has decided on a channel (and therefore the access point) of operation, the device 102 can discover access network operator information. In an embodiment, at 118, the device 102 can send a Discover Access Network Operators request to the Access Point 104. The Discover Access Network Operators request can comprise the selected channel. An example of a Discover Access Network Operators request can be an IEEE 802.11 ANQP request. In an embodiment, if the Access Point 104 can use internal access network operator data to respond to the Discover Access Network Operators request (e.g., the Access Point 104 can have a single access network operator for all channels), the Access Point can directly respond to the device 102 with a list of access network operators, such as the response at 124 of FIG. 1B.

Otherwise, if the Access Point 104 is unable to respond via its internal access network operator data, then at 120, the Access Point 104 can send a Discover Access Network Operators information request message to the Access Network Operator Database 106. The Discover Access Network Operators information request message can comprise one or more of: channel, time and location.

At 122, the Access Network Operator Database 106 can respond with an access network operator list for the available channels at the Access Point 104. The response at 122 may take into account the time, as an access network operator may not be available all the time.

Referring to FIG. 1B, at 124, the Access Point 104 can then respond to the device 102 with a list of possible access network operators for the requested channel.

Once the device 102 has decided on a channel (and therefore the access point) of operation, the device 102 can discover service provider information. In an embodiment, at 126, the device 102 can send a Discover Service Providers request to the Access Point 104. The Discover Service Providers request can comprise the selected channel.

In an embodiment, if the Access Point 104 can use its internal service provider data to respond to the discover service providers request (e.g., the Access Point 104 can have a single service provider for all channels and access networks), the Access Point 104 can directly respond with a list of available service providers, such as the list in response at 130).

Otherwise, if the Access Point 104 is unable to respond to the discovery service provider request via its internal service provider data, then at 128, the Access Point 104 can send a Discover Service Providers request message to a service provider information database (which may be referred to as a Service Provider Database 108). The Discover Service Providers request message can comprise one or more of channel, time and location.

In some embodiments, the Service Provider Database 108 can be co-located with the Access Network Operator Database 106, and both of these databases could be co-located with the Access Point 104.

At 130, the Service Provider Database 108 can respond with a service provider list for the available channels at the Access Point 104. The response at 130 can take into account the time, as a service provider may not be available all the time.

At 130, the Access Point 104 can then respond to the device 102 with a list of possible service providers for the requested channel. Accordingly, the device 102 can use the received access network operator list and the service provider list to associate to an access point and thereby connect to a service provider.

With some WLAN operating bands (e.g., 5 GHz radar band and 6 GHz band), radio regulations stipulate that the mobile WLAN device needs to know that there is an Access Point (master device) operating on the channel before the device can transmit any frames on those channels. In addition, some channels in the 6 GHz band are only available in a specific geo-location. This is typically achieved by using an out of band method to determine the available channel map.

As may be appreciated by a person skilled in the art, an accessible infrastructure network can refer to a network operating on channels that are available to the mobile WLAN device for connecting thereto via appropriate credentials. Embodiments described herein may provide for an improved network discovery, which may permit WLAN AP infrastructure to advertise neighboring APs that are operating or transmitting on other operating channels.

The existing 3-step discovery procedure (selection of channel, access network operator and service provider) can be inefficient and cause significant consumption of power and time. Under the existing discovery procedure, discovery or potential re-discovery of channels, by a WLAN device that meets the criteria of the second and third steps of the discovery procedure (i.e., discovery of access network operator and discovery of service provider) can be inefficient causing substantial consumption of power and time. In some instances, a WLAN device may be required to discover an access network operator before discovering a channel, which further renders the discovery procedure inefficient.

Further, as more and more unlicensed bands are made available for WLAN operation, efficiently discovering, by a device, WLAN infrastructure that has suitable credentials for connectivity has become more challenging.

As may be appreciated by a person skilled in the art, a WLAN device has a built-in fixed channel map for the operation of IEEE 802.11 within an ITS band. Since the built-in fixed channel map depends on radio regulations of a region or a country, a WLAN device crossing borders between such regions may be problematic. For example, if the ITS band channels change, the built-in fixed channel map may no longer be valid.

Figure 2:
FIG. 2 illustrates an example architecture, according to an embodiment of the present disclosure.

FIG. 2 illustrates an example architecture, according to an embodiment of the present disclosure. The architecture 200 may comprise one or more of: an access network operator 202, a service provider 204, an AP infrastructure 206, channel and access network operator information database 106, and a service provider information database 108. The access network operator 202 may be connected to the service provider 204, the AP infrastructure 206 and the channel and access network operator information database 106 as illustrated. The service provider 204 may be connected to the access network operator 202 and the service provider information database 108. The channel and access network operator information database 106 may be optionally connected to, or co-located with, the service provider information database 108. The AP infrastructure 206 may comprise one or more Access Points 104 which may be connected to the access network operator 202, as illustrated. Connection as used herein may refer to a wireless or wired connection, as appropriate.

Figure 3:
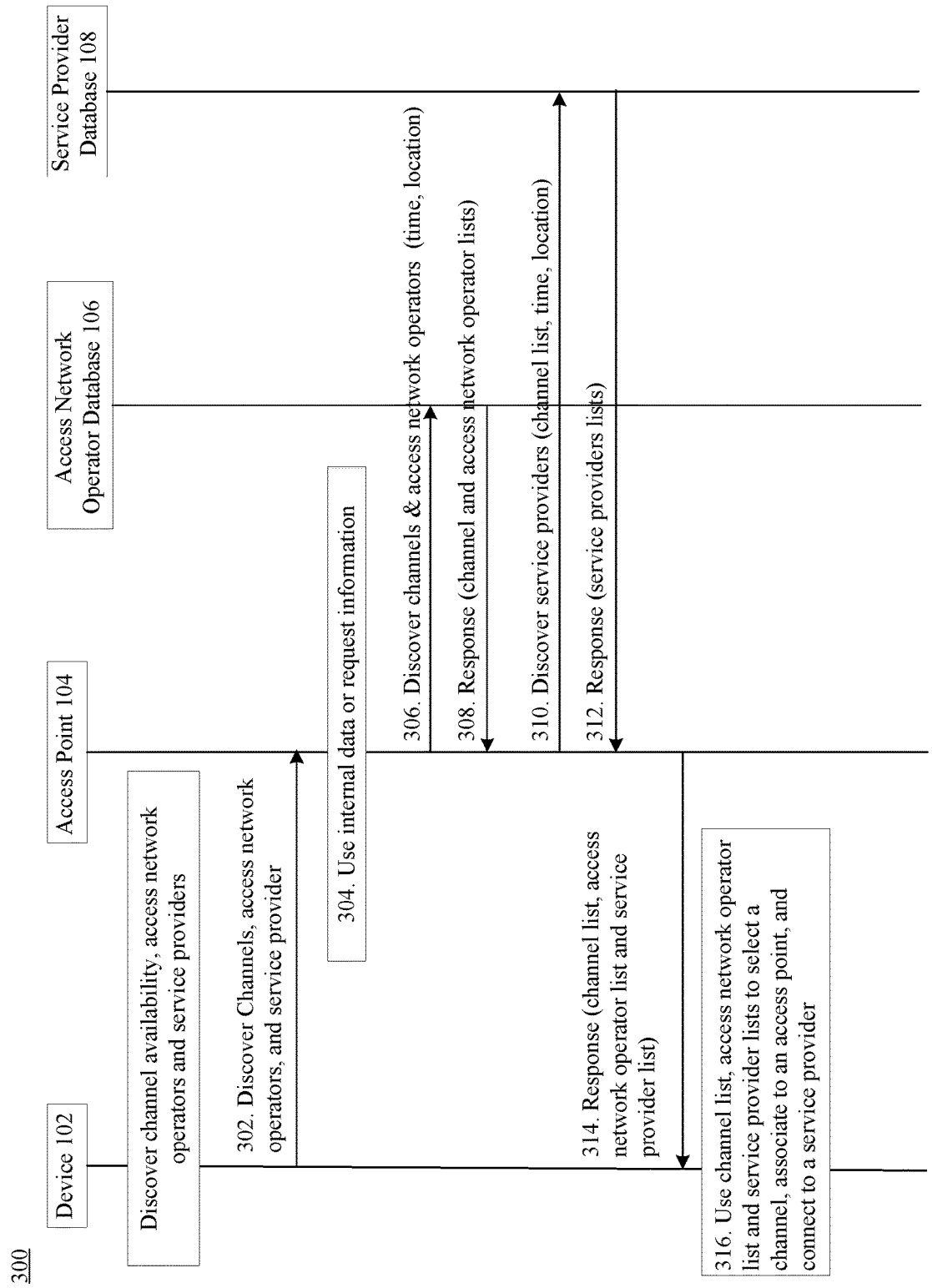
FIG. 3 illustrates an enhanced discovery procedure, according to an embodiment of the present disclosure.

Embodiments described herein can provide for an enhanced discovery procedure that combines the 3 steps in the existing discovery procedure (selection of channel, access network operator and service provider) into a single step as illustrated in FIG. 3. Accordingly, embodiments described herein can provide for improved use of network resources and improved connectivity.

In addition to making the discovery procedure more efficient, the enhanced discovery procedure described herein may provide additional benefits or advantages. According to embodiments described herein, a device can choose a suitable channel (and therefore an Access Point) that allows infrastructure access to an access network operator and a service provider that the device wishes to use or has credentials for, within a single discovery step.

Embodiments described herein may allow an Access Point 104 (or an Access Network Operator Database 106 and a Service Provider Database 108, if the Access Point decides to request external information) to discover information including channel, access network operator and service provider, where access network operators and service providers that are available on a specific channel (possibly within a given location and time) can be specified.

Embodiments described herein may provide for information that may be required for a secure public WLAN network discovery. To allow a WLAN client to discover whether it has been provisioned with compatible credentials, possibly before choosing a suitable channel of a secure public WLAN network, information is required about the access network operator and service provider.

According to embodiments described herein, an access network operator or a service provider may be able to advertise one or more of the operating channels, bands and required access credential information for the WLAN infrastructure, at a specific location, in the vicinity of the AP or in the vicinity of the AP infrastructure.

FIG. 3 illustrates an enhanced discovery message flow for channels, access network operator and service provider information, according to an embodiment of the present disclosure.

In an embodiment, device 102 can discover channel availability, access network operators and service providers according to the procedure 300. At 302, device 102 can send to an access point 104 a discovery request for one or more of available channels, Access Network Operators and Service Providers.

In an embodiment, the Access Point 104 can use its internal data to respond to the discovery request. For example, if the Access Point 104 can use internal data to determine available channels, the access network operators, or the service providers, the Access Point 104 can respond with such information. For example, the Access Point can respond with a response similar to the response at 314, wherein the response 314 comprises one or more of a channel list, an access network operator list, and a service provider list.

In some embodiments, the Access Point 104 can use its internal data to determine available channels and access network operator. For example, the Access Point 104 can determine, via its internal data, that channels 1-11 support within the 2.4 GHz band are available and are with the same access network operator(s)). In some embodiments, the Access Point 104 can use its internal data to determine one or more service providers associated with the available channels. If the Access Point 104 cannot determine, using its internal data, the one or more service providers, then the procedure 300 can move to step 310.

If the Access Point is also able to use internal data to determine channels and service provider (e.g., channels 1-11 support the same service provider(s)), then the Access Point 104 can directly respond to the device 102 with a response similar to the response at 314.

In some embodiments, both the Access Point 104 and the Access Network Operator Database 106 can be pre-configured with suitable information (e.g., the internal data mentioned herein), or have such information updated asynchronously (e.g., every 15 min). Accordingly, via pre-configuration or asynchronous updating, the Access Point can circumvent having to send several similar messages to the Databases 106 and 108 over a short period of time.

Otherwise, if the Access Point is unable to determine, via its internal data, the available channel and access network operators, then, at 306, Access Point 104 can send a Discover Channels & Access Network Operators request message to an Access Network Operator Database 106 (possibly via a wired or wireless connection). The Discover Channels & Access Network Operators request message can comprise information associated with one or more of the Access Point 104 and device 102. Information can comprise time and location information. The Access Network Operator Database 106 can be co-located or be common to a group of Access Points.

The Access Network Operator Database 106, at 308, can send a response comprising one or more of a channel list and an access network operator list (or multiple lists) of available channels of Access Points within radio range of the device. This may take into account location and time information received at 306. The response at 308 may comprise one or more enhanced fields indicating the one or more of access network operator list(s). The one or more enhanced fields may be formatted in different ways as described in embodiments herein.

In some embodiments, at 310, the Access Point 104 can send a Discover Service Providers request message to a Service Providers Database 108 (possibly via a wired or wireless connection). The Discover Service Providers request message can comprise one or more of channel list, time and location information. In some embodiments, the Service Providers Database 108 can be co-located with the Access Network Operators Database 106. In some embodiments, the two databases 106 and 108 can be co-located or be common to a group of Access Points. In some embodiments, the request messages sent at 306 and at 310 can be merged into one request message to co-located databases indicative of (access network operators and service providers) and the responses messages at 308 and at 312 can be merged into one response message from the co-located databases.

In some embodiments, at 312, the Service Providers Database 108 can respond with a service providers list (or multiple lists) for the Access Points within radio range of the device. The response at 312 may take into account location and time. The response at 308 may comprise one more enhanced fields indicating the one or more of service provider list(s). The one or more enhanced fields may be formatted in different ways as described in embodiments herein.

Either the Access Point 104, or both of the databases, can determine information comprising triplets of channel, access network operator and service provider, where access network operators and service providers that are available on a specific channel (possibly within a given location and time) can be specified. The one or more of channel lists, access network operator lists and service provider lists within the responses at 308 and at 312 may be formatted in several different ways as indicated in embodiments described herein.

In some embodiments, the Access Point 104, at 314, can then send a response to the device 102, the response comprising one or more of: a channel list, an access network operator list, and service provider list. In some embodiments, the response at 314 can comprise multiple lists of one or more of the access network operators and the service providers. The response at 314 may comprise one or more enhanced fields indicating the one or more of: channel(s), access network operator(s) and service provider(s). The one or more enhanced fields may be formatted in different ways as described in embodiments herein.

Upon receipt the response, the device 102, at 316, can then choose a channel based on both the access network operator and service provider information. Once the device 102 has made a choice, it selects and associates with the chosen Access Point, allowing access to the service provider through the access network operator.

Channels referred to in reference to FIG. 4 can occur in the 900 MHz, 2.4 GHz, 3.65 GHz, 5 GHz, 6 GHz, 45 GHz and 60 GHz bands.

Embodiments described herein may modify existing WLAN channel discovery information to include an access network operator list and a service provider list. As described herein, embodiments may allow a device to discover both channels and one or more identities of the access network operator and service provider in a single step.

In some embodiments, depending on the system configuration, either the access network operator or service provider information may not be used. As may be appreciated by a person skilled in the art, the access network operator and service provider information can assist a device in choosing an access point to associate with. In some embodiments, the internal decision process within the device may not need all information (e.g., the access network operator information and the service provider information) and so some of the information may not be used. Correspondingly, in some embodiments, the access network operator may be blank or irrelevant, in which case the device decides not to trust it. In some embodiments, the access network operator may be the same as the service provider.

Embodiments described herein may provide for enhanced WFA AFC information response comprising one or more fields indicating "Access Network Operator" list and "Service Provider" list.

FIG. 4 illustrates enhanced message fields for a WFA AFC system, according to an embodiment of the present disclosure. Referring to FIG. 4, the Operating Class sub-object in Table 19 (WFA AFC System to AFC Device Interface Specification v0.1.17) can be enhanced by adding one or more fields indicating one or more of: access network operator(s) and service provider(s). The access network operator(s) may be associated with a WLAN infrastructure. The service provider(s) may be associated with the Global operating class (as referenced in Annex E.1 of IEEE 802.11-2020).

In some embodiments, the Access Network Operator list field can be set to one or more identifiers of the WLAN infrastructure to which the access point is connected. In some embodiments, the Service Provider list field can be set to an NAI Realm(s), PLMN identifier(s) or another identifier(s) for an operator, such as a Roaming Consortium Identifier.

In some embodiments, The Access Network Operator list field and the Service Provider list field can be added to the "Available Spectrum Inquiry response message" in addition to the existing frequency and channel information fields.

In some embodiments, a system that has multiple AccessNetworkOperators and ServiceProviders for different channel sets (e.g., different Service Providers serve different WLAN channels, available through the same access point), may have multiple information triplets with the response message.

Embodiments described herein may provide for an enhanced IEEE 802.11 Discovery Report comprising one or more fields indicating one or more lists of access network operators and service providers. For example, the existing IEEE 802.11 Reduced Neighbor Report (RNR) can be extended to include one or more fields indicating one or more lists of Access Network Operator(s) and Service Provider(s).

In some embodiments, the Access Network Operator(s) field can be set to a list of identifiers of the WLAN infrastructure to which the access point is connected. In some embodiments, the indicating Service Provider(s) field can be set to a list of NAI Realms, PLMNs, or Roaming Consortiums identifier. In some embodiments, to make the information concise, the Service Provider(s) field could be restricted to either the home or visited operator.

The enhanced IEEE 802.11 Discovery Report can be achieved by several alternative modifications. The enhanced IEEE 802.11 Reduced Neighbor Report (RNR) can be based on embodiment described in reference to FIG. 5.

FIG. 5 illustrates an enhanced neighbor AP information field format, according to an embodiment of the present disclosure. The enhanced neighbor AP information field is a sub-field of the Reduced Neighbor Report (IEEE 802.11-202 FIG. 9-629). The enhanced neighbor AP information field format 500 can be applied to the Neighbor AP Information field (IEEE 802.11-2020 FIG. 9-630), as may be appreciated by a person skilled in the art.

The enhanced neighbor AP information field format 500 can comprise one or more fields indicating one or more of: Target Beacon Transmission Time (TBTT) Information Header 502, Operating Class 504, Channel Number 506, TBTT Information Set 508, Access Network Operator(s) 510, and Service Providers 512.

In some embodiments, the enhanced neighbor AP information field format 500 can be applied to the Neighbor Report element (IEEE 802.11-2020 FIG. 9-336). For example, the Neighbor Report element (IEEE 802.11-2020 FIG. 9-336) can be extended to include one or more fields indicating one or more lists of Access Network Operator(s) and Service Provider(s).

In some embodiments, the enhanced IEEE 802.11 Discovery Report can be based on extending the Supported Operating Classes element (IEEE 802.11-2020 FIG. 9-370) by adding one or more fields indicating one or more of Access Network Operator(s) and Service Provider(s).

FIG. 6 illustrates an enhanced supported operating class element field format, according to an embodiment of the present disclosure. In an embodiment, the enhanced supported operating class element field format can comprise one or more fields indicating one or more of: element ID 602, Length 604, Current Operating Class 606, Operating Class 608, Access Network Operator(s) 610 and Service Provider(s) 612.

In some embodiments, the enhanced IEEE 802.11 Discovery Report can be based on an Access Network Query Protocol (ANQP)-element that can be created to return an access network operator list and a service provider list, as shown in FIG. 7. FIG. 7 illustrates an ANQP-element format, according to an embodiment of the present disclosure. The ANQP-element format can comprise one or more fields indicating one or more of: Length 704, Access Network Operator(s) 710, and Service Provider(s) 712.

Embodiments described in reference to FIGS. 4, 5, 6 and 7 may apply to one or more responses at 308, 312 and 314 of FIG. 3.

Embodiments described herein may improve network discovery via a more efficient procedure. Embodiments described herein enable WLAN AP infrastructure to advertise neighboring APs on other operating channels. As extra considerations are taken into account by user devices (e.g., data privacy, channel throughput, verification of network legitimacy), network discovery requires to become more efficient.

Embodiments described herein may allow a WLAN device operating in an ITS band to send a channel and access network operator list query when the device is in range of a border.

Different regulatory domains can have different ITS band allocations and offer different network operator policies that can include different channel maps. Furthermore, ITS operations can use a different technology, for example (Dedicated Short Range Communications (DSRC) vs LTE).

Embodiments described herein may provide a mechanism for a device, e.g., a vehicle, to obtain new operator policy and channel map, when the device crosses into a new regulatory domain. In some embodiments, an operator ID can be used to indicate a new operator policy.

In some embodiments, a WLAN device can commence a channel and operator ID search when the device is in the vicinity of a radio regulatory domain change (e.g., a border). The intention is to discover channels and operator IDs prior to a radio regulatory domain change. Such embodiments may be referred to as the ITS band solution (OCB).

Figure 8:
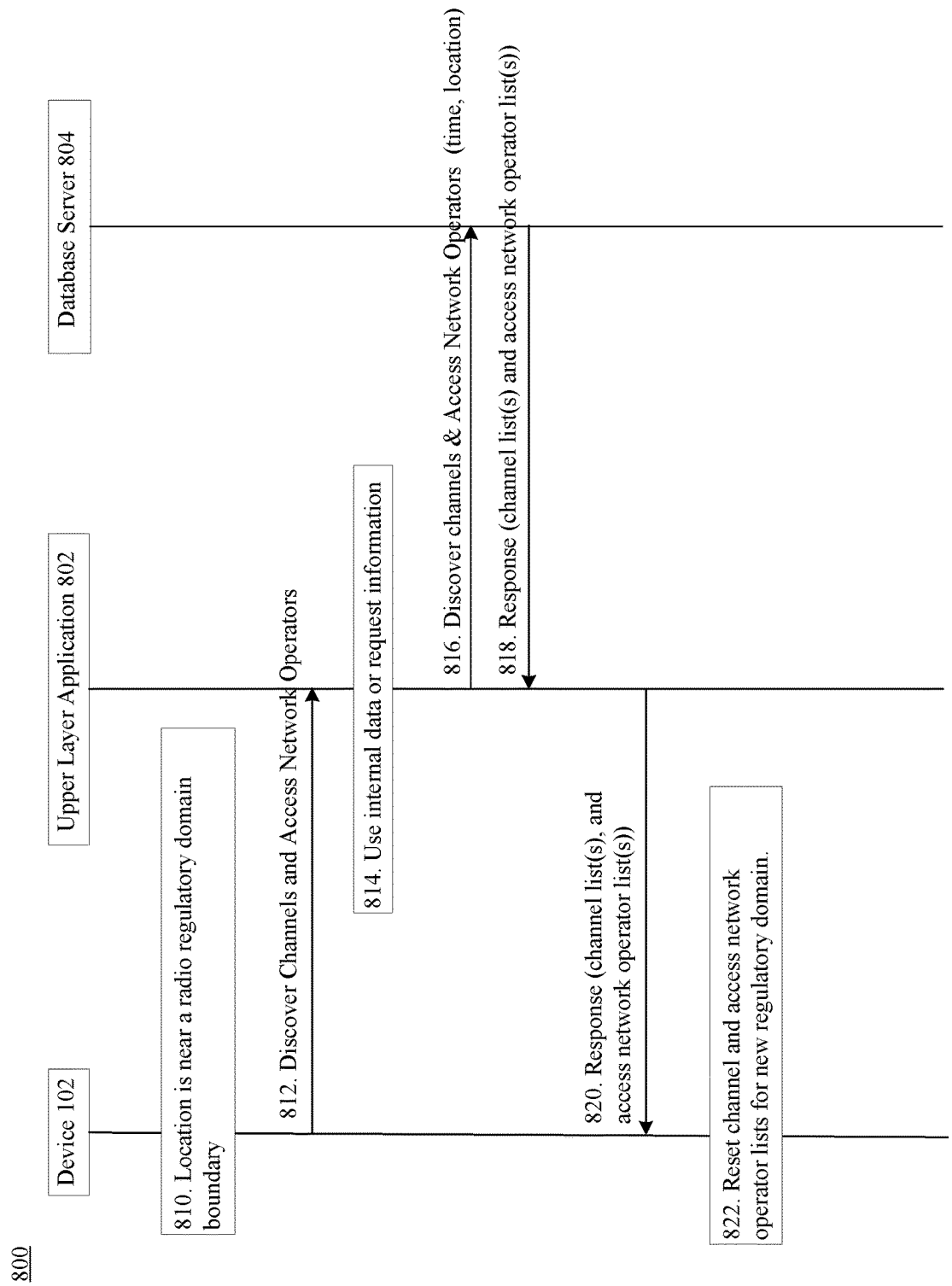
FIG. 8 illustrates a WLAN Intelligent Transport System (ITS) band discovery procedure, according to an embodiment of the present disclosure.

FIG. 8 illustrates a WLAN ITS band discovery procedure, according to an embodiment of the present disclosure.

In an embodiment, at 810, location of a device 102 can be determined to be near or at a location of a regulatory domain boundary (e.g., a border). At 812, the device 102 can send a discovery request for one or more of available Channels and Access Network Operators to an Upper Layer Application (ULA) 802 that is associated with the device 102. As may be appreciated by a person skilled in the art, in the ITS, the access network operator is the same as the service provider. In some embodiments, the ULA 802 can be within or co-located with the device 102. In some embodiments, the discovery request at 812 is an internal message.

In some embodiments, the ULA 802 can use its internal data to determine one or more of: channels and access network operators. For example, ULA 802 can determine, via its internal data that channel 172 (a valid ITS channel) support within the 5.9 GHz band is available and is with the same access network operator(s)). In such embodiments, the ULA 802 can send a response comprising one or more lists of: channels and access network operators. The response can be similar to response at 820 for example.

Otherwise, if the ULA is unable to determine the requested Channel(s) and Access Network Operator(s), at 816, the ULA 802 can send a discovery request for Channels and Access Network Operators request message to a Database Server 804. The Database Server 804 can be similar to the Access network operator database 106. The discovery request message can comprise information associated with the one or more of the ULA 802 and the Device 102. The information can comprise time and location information. The ULA 802 can use any appropriate method, as appreciated by a person skilled in the art, to send the request message at 816. In some embodiments, the ULA 802 can use an out of band method such as using a wired internet connection to send the request message at 816.

At 818, the Database Server 804 can send a response comprising one or more lists of channel(s) and access network operator(s) of available channels in the new regulatory domain(s). The response at 818 may take into account the location and time information received at 816. The response including one or more lists may be formatted according to embodiments described herein, for example embodiments described in reference to FIG. 9.

After receiving the response, the ULA 802 at 820 can then send a response comprising one or more of: channel list(s) and access network operator list(s). In some embodiments the response at 820 is sent internally within the device.

At 822, the device 102 can cross the radio regularity boundary and choose a channel based on the access network operator information. Once the device 102 has made a choice, it can communicate with the ITS system in the new radio regularity domain.

In some embodiments, the device 102 can store the original channel settings (e.g., previous channel and access network operator information), so that if the device returns to the original radio regularity domain it already knows the settings. In some embodiments, the channel settings (e.g., channel information and access network operator information) can be subject to a period of time validity, after which the channel settings may need to re-check the channel and access network operator information.

According to embodiments described herein, a WLAN device can choose a suitable channel (and therefore an Access Point) that allows infrastructure access to an access network and a service provider that the WLAN device wishes to use or has credentials for.

FIG. 9 illustrates an enhanced frame field format, according to an embodiment of the present disclosure. In an embodiment, the enhanced frame field format 900 can comprise one or more fields indicating one or more of: element ID 902, Length 904, Current Operating Class 906, Operating Class 908, Upper Layer Application 910 and Network Access Provider(s) 912. In some embodiments, an Upper Layer Application can be allocated to one or more specific channels by a network access operator.

According to embodiments described herein, an Access Point (or one or more relevant Databases (e.g., Access Network Operator Database 106 and Service Provider Database 108) if the Access Point decides to request external information) can determine Channel information associated with one or more of: Access Network Operator information and Service Provider Information. Accordingly, one or more identities of access network operator(s) and service provider(s) that are available on a specific channel (possibly within a given location and time) can be specified.

According to embodiments described herein, a WLAN device operating in an ITS band can update its channel map after a validity time period or when the WLAN device changes regulatory domains.

Figure 10:
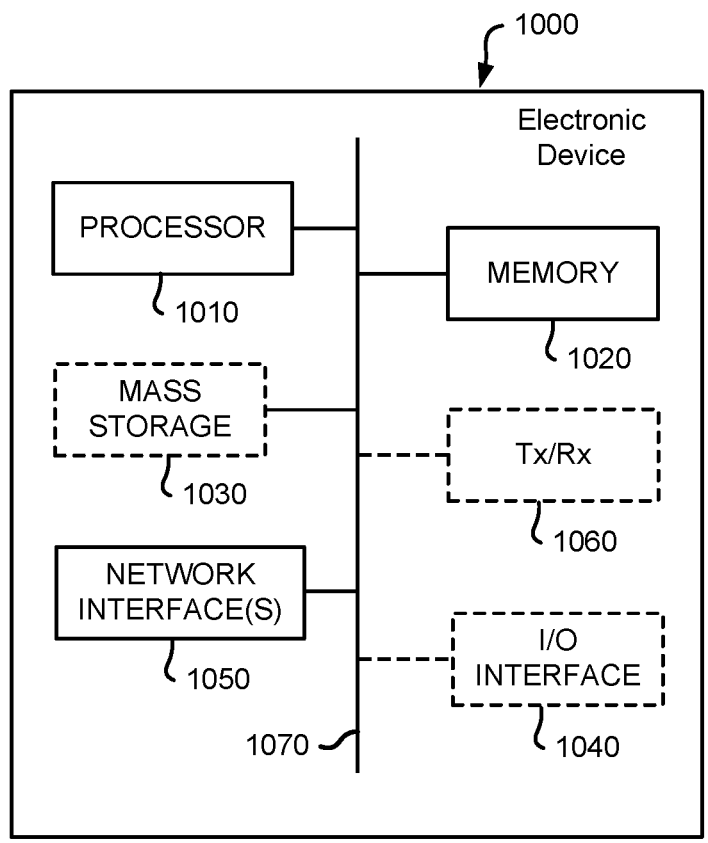
FIG. 10 is a schematic diagram of an electronic device that may perform any or all of operations of the above methods and features explicitly or implicitly described herein, according to different embodiments of the present invention.

FIG. 10 is a schematic diagram of an electronic device that may perform any or all of operations of the above methods and features explicitly or implicitly described herein, according to different embodiments of the present invention. For example, a computer equipped with network function may be configured as electronic device 1000. In some embodiments, the electronic device 1000 may be a user equipment (UE), which may refer to a wireless mobile device for example. In some embodiment the electronic device 1000 may be device 102 or stations (STA), a vehicle operating as an "Outside the Context of BSS" (OCB) device, or other devices as contemplated in different embodiments described herein. In some embodiments, the electronic device 1000 may have an out of band connection to either an Access Point 104, Access Network Operator Database 106, Service Provider Database 108 or the internet. This can be either a wired or wireless connection.

As shown, the electronic device 1000 may include a processor 1010, such as a Central Processing Unit (CPU) or specialized processors such as a Graphics Processing Unit (GPU) or other such processor unit, memory 1020, non-transitory mass storage 1030, input-output interface 1040, network interface 1050, and a transceiver 1060, all of which are communicatively coupled via bi-directional bus 1070.

According to certain embodiments, any or all of the depicted elements may be utilized, or only a subset of the elements. Further, electronic device 1000 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 1020 may include any type of non-transitory memory such as static random access memory (SRAM), dynamic random access memory (DRAM), synchronous DRAM (SDRAM), read-only memory (ROM), any combination of such, or the like. The mass storage element 1030 may include any type of non-transitory storage device, such as a solid state drive, hard disk drive, a magnetic disk drive, an optical disk drive, USB drive, or any computer program product configured to store data and machine executable program code. According to certain embodiments, the memory 1020 or mass storage 1030 may have recorded thereon statements and instructions executable by the processor 1010 for performing any of the aforementioned method operations described above.

FIG. 11 illustrates a discovery procedure according to an embodiment of the present disclosure. The procedure 1100 comprises, at 1102, sending a request to an access point for discovering a network, the request requesting for: available channels of access points within a radio range of the device; one or more access network operators for the available channels; and one or more service providers for the available channels. The procedure 1100 further comprises, at 1104, receiving from the access point a response message comprising one or more lists indicative of: the available channels, the one or more access network operators, and the one or more service providers.

In some embodiments, the procedure 1100 further comprises, at 1106, selecting a channel based on the received available channels. In some embodiments, the procedure 1100 further comprises, at 1108, corresponding to an access point corresponding with the selected channel. In some embodiments, the procedure 1100 further comprises, at 1110, connecting to a service provider of the one or more service providers.

FIG. 12 illustrates another discovery procedure according to an embodiment of the present disclosure. The procedure 1200 comprises, at 1202, receiving a request for discovering a network, the request requesting for: available channels of access points within a radio range of the device; one or more access network operators for the available channels; and one or more service providers for the available channels. The procedure 1200 further comprises, at 1204, determining network information based on the discovery request. The procedure 1200 further comprises, at 1210, sending, to the device, a response message comprising the network information comprising one or more lists indicative of: the available channels, the one or more access network operators, and the one or more service providers.

In some embodiment, the procedure 1200 further comprises, at 1206, sending, to an access network operator database, a request for the available channels and the one or more access network operators. In some embodiment, the procedure 1200 further comprises receiving, from the access network operator database, a response message indicating the available channels and the one or more access network operators.

In some embodiment, the procedure 1200 further comprises, at 1208, sending, to a service provider database, a request for the one or more service providers. In some embodiment, the procedure 1200 further comprises receiving, from the service provider database, a response message indicating the one or more service providers.

FIG. 13 illustrates another discovery procedure, according to an embodiment of the present disclosure. The procedure 1300 comprises, at 1302, approaching, from a first regulatory domain, a second regulatory domain, wherein each of the first regulatory domain and the second regulatory domain has respective channel settings. The procedure 1300 further comprises, at 1304, determining, at a regulatory domain boundary between the first regulatory domain and the second regulatory domain, channel settings for the second regulatory domain comprising one or more of: available channels and access network operators associated with the available channels. The procedure 1300 further comprises, at 1308, selecting a channel and an associated access network operator from the channel settings for the second regulatory domain. The procedure 1300 further comprises, at 1310, communicating with an intelligent transport system in the second regulatory domain.

In some embodiments, the procedure 1300 further comprises, at 1306, sending a discovery request for the channel settings for the second regulatory domain to an upper layer application of the device. In some embodiments the procedure 1300 further comprises receiving the channel settings for the second regulatory domain from the upper layer application of the device.

According to an aspect of the disclosure a method performed by a device is provided. The method includes approaching, from a first regulatory domain, a second regulatory domain, wherein each of the first regulatory domain and the second regulatory domain has respective channel settings. The method further includes determining, at a regulatory domain boundary between the first regulatory domain and the second regulatory domain, channel settings for the second regulatory domain comprising one or more of: available channels and access network operators associated with the available channels. The method further includes selecting a channel and an associated access network operator from the channel settings for the second regulatory domain. The method further includes communicating with an intelligent transport system in the second regulatory domain. The method may provide for an enhanced procedure for discovering a network. The method may provide for an improved procedure that is resource efficient.

In some embodiments, the method further includes storing internally channel settings associated with the first regulatory domain.

In some embodiments, the determining includes sending a discovery request for the channel settings for the second regulatory domain to an upper layer application of the device. In some embodiments, the determining further includes receiving the channel settings for the second regulatory domain from the upper layer application of the device.

In some embodiments, the channel settings for the second regulatory domain are based on internal data of the upper layer application. The method may provide for an efficient way, via internal data, to discover a network.

In some embodiments, the channel settings for the second regulatory domain are based on one or more databases indicative of the channel settings for the second regulatory domain.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disc read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include a number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method by a device, the method comprising:
   sending a discovery request to an access point for discovering a network, the discovery request requesting for: available channels of access points within a radio range of the device; one or more access network operators for the available channels; and one or more service providers for the available channels; and
   receiving from the access point a response message comprising one or more lists indicative of: the available channels, the one or more access network operators, and the one or more service providers.

2. The method of claim 1, wherein the response message is based on internal data of the access point.

3. The method of claim 1, wherein the response message is based on one or more databases indicative of one or more of access network operators and one or more of service providers.

4. The method of claim 1, wherein the response message comprises one or more fields indicating one or more of access network operators and service providers.

5. The method of claim 1 further comprising:
    selecting a channel based on the available channels;
    corresponding to an access point corresponding with the selected channel; and
    connecting to a service provider of the one or more service providers.

6. A method by an access point, the method comprising:
    receiving, from a device, a discovery request for discovering a network, the discovery request requesting for: available channels of access points within a radio range of the device; one or more access network operators for the available channels; and one or more service providers for the available channels;
    determining network information based on the discovery request; and
    sending, to the device, a response message comprising the network information comprising one or more lists indicative of: the available channels, the one or more access network operators, and the one or more service providers.

7. The method of claim 6, wherein the determining network information based on the discovery request comprises determining the network information based on internal data of the access point.

8. The method of claim 6, wherein the determining network information based on the discovery request comprises:
    sending, to an access network operator database, a request for the available channels and the one or more access network operators; and
    receiving, from the access network operator database, a response message indicating the available channels and the one or more access network operators.

9. The method of claim 6 further comprising:
    sending, to a service provider database, a request for the one or more service providers; and
    receiving, from the service provider database, a response message indicating the one or more service providers.

10. The method of claim 6, wherein the response message comprises one or more fields indicating: the one or more access network operators and the one or more service providers.

11. An apparatus comprising:
    at least one processor and at least one machine-readable medium storing executable instructions which when executed by the at least one processor configure the apparatus for:
    sending a discovery request to an access point for discovering a network, the discovery request requesting for: available channels of access points within a radio range of the apparatus; one or more access network operators for the available channels; and one or more service providers for the available channels; and
    receiving from the access point a response message comprising one or more lists indicative of: the available channels, the one or more access network operators, and the one or more service providers.

12. The apparatus of claim 11, wherein the response message is based on internal data of the access point.

13. The apparatus of claim 11, wherein the response message is based on one or more databases indicative of one or more of access network operators and one or more of service providers.

14. The apparatus of claim 11, wherein the response message comprises one or more fields indicating one or more of access network operators and service providers.

15. The apparatus of claim 11, wherein the executable instructions which when executed by the at least one processor further configure the apparatus for
    selecting a channel based on the available channels;
    corresponding to an access point corresponding with the selected channel; and
    connecting to a service provider of the one or more service providers.

* * * * *